US012772356B2

(12) United States Patent
Kim et al.

(10) Patent No.: US 12,772,356 B2
(45) Date of Patent: Oct. 20, 2026

(54) LIGHT-EMITTING DIODE DRIVING DEVICE AND METHOD FOR GENERATING DRIVING SIGNAL THEREFOR

(71) Applicants: Min Seon Kim, Hwaseong-si (KR); Global Technologies Co., Ltd., Hwaseong-si (KR)

(72) Inventors: Young Hoon Kim, Gwacheon-si (KR); Gea Ok Cho, Hwaseong-si (KR); Min Seon Kim, Hwaseong-si (KR)

(73) Assignees: Min Seon Kim, Hwaseong-si (KR); GLOBAL TECHNOLOGIES CO., LTD., Hwaseong-si (KR)

( * ) Notice: Subject to any disclaimer, the term of this patent is extended or adjusted under 35 U.S.C. 154(b) by 2 days.

(21) Appl. No.: 19/212,641

(22) Filed: May 19, 2025

(65) Prior Publication Data

US 2025/0386408 A1 Dec. 18, 2025

(30) Foreign Application Priority Data

Jun. 12, 2024 (KR) ........................ 10-2024-0076620

(51) Int. Cl.
*H05B 45/37* (2020.01)
*H05B 45/335* (2020.01)

(52) U.S. Cl.
CPC ........... *H05B 45/37* (2020.01); *H05B 45/335* (2020.01)

(58) Field of Classification Search
CPC ...... H05B 45/37; H05B 45/335; H05B 45/59; H05B 45/10
See application file for complete search history.

(56) References Cited

U.S. PATENT DOCUMENTS

| | | | | |
|---|---|---|---|---|
| 2009/0001905 | A1* | 1/2009 | VanEss .................. | H05B 45/37 315/302 |
| 2009/0102866 | A1* | 4/2009 | Lim ..................... | H05B 45/325 345/690 |
| 2011/0291584 | A1 | 12/2011 | Filippo et al. | |
| 2012/0069059 | A1 | 3/2012 | Lee | |
| 2013/0076250 | A1* | 3/2013 | Logiudice ............. | H05B 45/37 315/161 |
| 2015/0223299 | A1 | 8/2015 | Stockstad et al. | |
| 2015/0317951 | A1 | 11/2015 | Genoe | |
| 2023/0139266 | A1 | 5/2023 | Ooga | |
| 2023/0143912 | A1 | 5/2023 | Ryu et al. | |

FOREIGN PATENT DOCUMENTS

| | | | | |
|---|---|---|---|---|
| CN | 103024987 B * | 4/2015 | ............. | H05B 45/37 |
| KR | 20010046895 A | 6/2001 | | |

* cited by examiner

*Primary Examiner* — Raymond R Chai
(74) *Attorney, Agent, or Firm* — CANTOR COLBURN LLP

(57) ABSTRACT

A light-emitting diode driving device using a control signal of (M+N) bits includes: a sigma-delta modulator configured to receive M bits of the control signal and generate a modulation signal of 1 bit; a first summer configured to sum N1 bits selected from N bits of the control signal with the modulation signal to generate a first sum signal; and a driver configured to receive the first sum signal and generate a driving signal.

10 Claims, 4 Drawing Sheets

Fig. 4

| binary code | thermometer code |
|---|---|
| 0000 | 000 0000 0000 0000 |
| 0001 | 000 0000 0000 0001 |
| 0010 | 000 0000 0000 0011 |
| 0011 | 000 0000 0000 0111 |
| 0100 | 000 0000 0000 1111 |
| 0101 | 000 0000 0001 1111 |
| 0110 | 000 0000 0011 1111 |
| 0111 | 000 0000 0111 1111 |
| 1000 | 000 0000 1111 1111 |
| 1001 | 000 0001 1111 1111 |
| 1010 | 000 0011 1111 1111 |
| 1011 | 000 0111 1111 1111 |
| 1100 | 000 1111 1111 1111 |
| 1101 | 001 1111 1111 1111 |
| 1110 | 011 1111 1111 1111 |
| 1111 | 111 1111 1111 1111 |

LIGHT-EMITTING DIODE DRIVING DEVICE AND METHOD FOR GENERATING DRIVING SIGNAL THEREFOR

BACKGROUND OF THE INVENTION

Field of the Invention

Embodiments disclosed in the present specification relate to a light-emitting diode driving device, and a method for generating a driving signal therefor.

Description of the Related Art

Sigma-delta modulation may be used to convert a digital signal into a high-frequency 1-bit stream.

Korean Patent Publication No. 10-2009-0040772 (hereinafter, referred to as "the related art") discloses "APPARATUS FOR CONTROLLING LIGHTING USING DIGITAL SIGMA-DELTA".

However, when the brightness of lighting, such as an LED, is controlled only by the pulse width of the output of a sigma-delta modulator (200-1 to 200-*n*) as in the related art, the resolution of the brightness of lighting, such as an LED, is limited and the flicker thereof is also likely to occur. In order to increase the resolution of the brightness of lighting and reduce the flicker by using only the output of the sigma-delta modulator (200-1 to 200-*n*), it is necessary to increase the frequency of a reference clock used in the sigma-delta modulator (200-1 to 200-*n*). However, increasing the frequency of the reference clock increases the error in the accuracy of the output of the sigma-delta modulator (200-1 to 200-*n*).

In addition, the peak-to-peak level of the amplitude of the pulse output to an LED driver (300-1 to 300-*n*) is high, and electromagnetic interference (EMI) is thus high.

The foregoing is intended merely to aid in the understanding of the background of the present disclosure, and is not intended to mean that the present disclosure falls within the purview of the related art that is already known to those skilled in the art.

SUMMARY OF THE INVENTION

Embodiments disclosed in the present specification have been made keeping in mind the above problems occurring in the related art, and are directed to providing a light-emitting diode driving device, and a method for generating a driving signal therefor, the device and the method adopting a sigma-delta modulation scheme and realizing high resolution, low flicker, and low electromagnetic interference (EMI).

According to a first embodiment and a second embodiment, there is provided a light-emitting diode driving device using a control signal of (M+N) bits, the light-emitting diode driving device including: a sigma-delta modulator configured to receive M bits of the control signal and generate a modulation signal of 1 bit; a first summer configured to sum N1 bits selected from N-bits of the control signal with the modulation signal to generate a first sum signal; and a driver configured to receive the first sum signal and generate a driving signal.

M is a natural number equal to or greater than 2, N1 is a natural number equal to or greater than 1, and N is a natural number equal to or greater than N1.

In addition, the driving signal of the light-emitting diode driving device according to the first embodiment and the second embodiment corresponds to a signal resulting from summing a reference level signal determined by the N bits of the control signal and a pulse activation frequency signal determined by the M bits of the control signal.

The driver of the light-emitting diode driving device according to the second embodiment includes: a first decoder configured to decode the first sum signal to generate a first thermometer code; a second decoder configured to decode N2 bits selected from the N bits of the control signal to generate a second thermometer code; a first converter configured to convert the first thermometer code into an analog signal to generate a first analog signal; and a second converter configured to convert the second thermometer code into an analog signal to generate a second analog signal, N2 is a natural number equal to or greater than 1, and N has a value equal to the sum of N1 and N2.

The driver of the light-emitting diode driving device according to the second embodiment is configured to generate the driving signal by summing a first analog signal resulting from converting the first sum signal into an analog signal and a second analog signal resulting from converting N2 bits selected from the N bits of the control signal into an analog signal.

The light-emitting diode driving device and the method for generating a driving signal therefor according to the embodiments disclosed in the present specification can adopt the sigma-delta modulation scheme and can realize high resolution, low flicker, and low electromagnetic interference (EMI).

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 4 shows a correspondence table of binary code and thermometer code according to an embodiment.

DETAILED DESCRIPTION OF THE INVENTION

Hereinafter, a light-emitting diode driving device and a method for generating a driving signal therefor according to embodiments of the present disclosure will be described in detail with reference to the accompanying drawings. It is noted that the embodiments of the present disclosure are illustrative of the present disclosure and do not limit the scope of the present disclosure. What can be easily inferred by those skilled in the art from the detailed description and embodiments of the present disclosure is interpreted as belonging to the scope of the present disclosure.

Each configuration of the light-emitting diode driving devices (100, 200) described in this specification represents a unit that performs at least one function or operation, and may be implemented in hardware using various elements, such as an application-specific integrated circuit ("ASIC"), or implemented in software executed by a microprocessor or similar device, or implemented as a combination of hardware and software. That is, each of the configurations included in light-emitting diode driving devices 100 and 200 may be implemented by hardware, software, or a combination of hardware and software.

The light-emitting diode driving devices 100 and 200 according to the embodiments of the present disclosure may use a control signal of (M+N) bits (CON(M+N)) to generate a driving signal (S_D) for a light-emitting diode. Among (M+N) bits, a control signal of N bits (CON(N)) is in the higher-order bits than a control signal of M bits (CON(M)), M is a natural number equal to or greater than 2, and N is a natural number equal to or greater than 1. The control signal of (M+N) bits (CON(M+N)) corresponds to a signal for controlling the brightness of the light-emitting diode.

When multiple light-emitting diodes are driven, multiple light-emitting diode driving devices 100 and 200 according to the embodiments of the present disclosure may be used in parallel, thereby enabling the implementation of a lighting device or a display.

Figure 1:
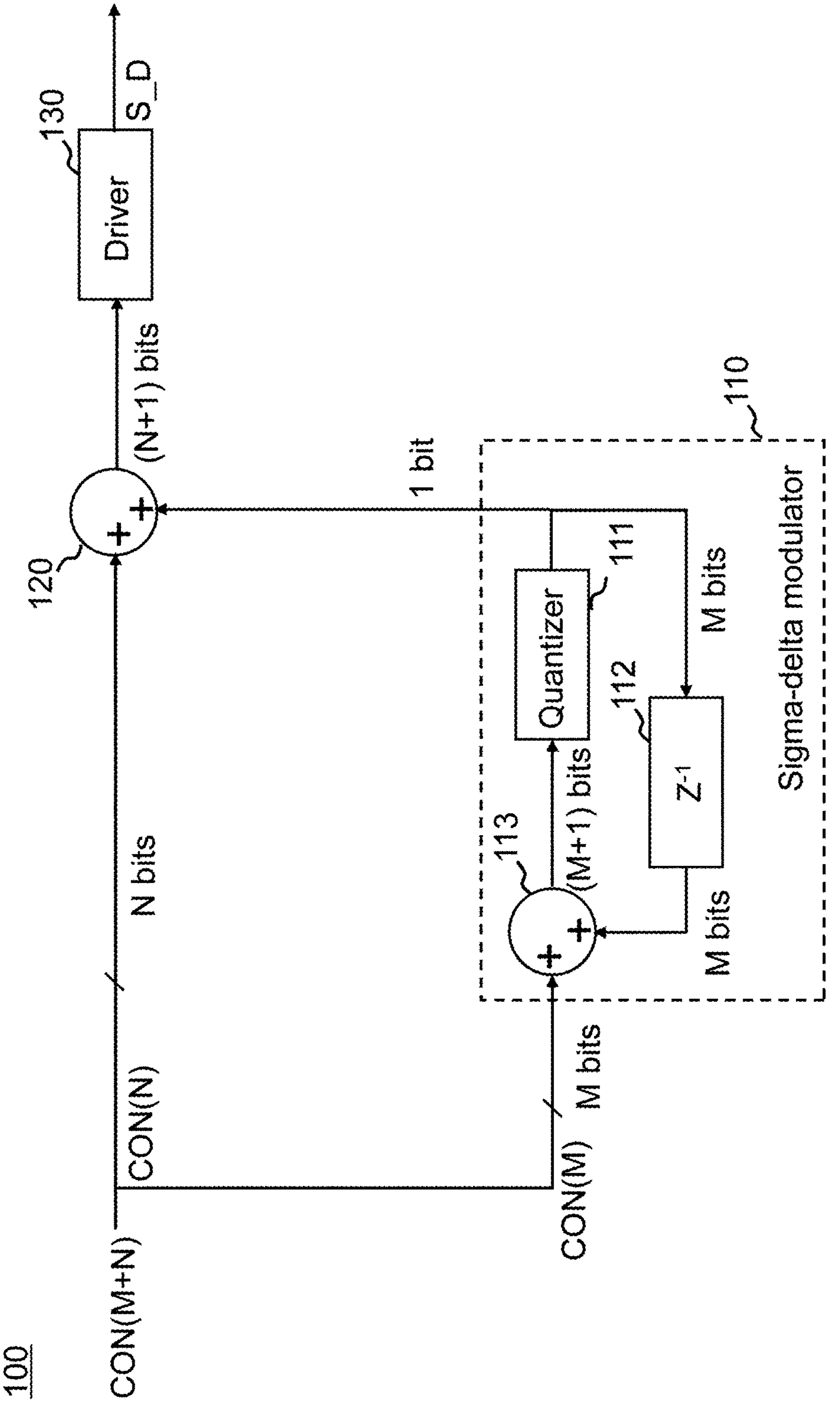
FIG. 1 shows a configuration diagram of a light-emitting diode driving device according to a first embodiment.

FIG. 1 shows a configuration diagram of a light-emitting diode driving device 100 according to a first embodiment.

As can be seen from FIG. 1, the light-emitting diode driving device 100 according to the first embodiment may include a sigma-delta modulator 110, a first summer 120, and a driver 130.

The sigma-delta modulator 110 receives the control signal of M bits (CON(M)) and generates a quantized modulation signal of 1 bit, under a sigma-delta modulation scheme according to a reference clock (not shown). Similarly to pulse width modulation, the sigma-delta modulator 110 adjusts the frequency of activation of a pulse according to the value of the control signal of M bits (CON(M)) and outputs the modulation signal of 1 bit in the form of a bit stream. That is, the higher the value of the control signal of M bits (CON(M)), the higher the frequency with which the pulse becomes high. The lower the value of the control signal of M bits (CON(M)), the lower the frequency with which the pulse becomes high.

Specifically, the sigma-delta modulator 110 may include a quantizer 111, a feedback signal generator 112, and a second summer 113.

The quantizer 111 receives a second sum signal and generates the quantized modulation signal of 1 bit.

In addition, the feedback signal generator 112 receives a lower-order M-bit signal other than the quantized modulation signal of 1 bit of the second sum signal from the quantizer 111 and generates a feedback signal. The feedback signal generator 112 generates the feedback signal resulting from delaying the lower-order M-bit signal by multiplying the modulation signal by $Z^{-1}$. For example, the feedback signal generator 112 may generate the feedback signal by delaying the lower-order M-bit signal by one reference clock.

The second summer 113 sums the control signal of M bits (CON(M)) and the feedback signal to generate the second sum signal of (M+1) bits. The feedback loop causes the second summer 113 to continue summing, resulting in the accumulation of the control signal of M bits (CON(M)). That is, the second summer 113 accumulates and integrates the control signal of M bits (CON(M)), which is an input digital signal, through multiple steps.

The first summer 120 sums a control signal of N1 bits of the control signal of N bits (CON(N)) and the modulation signal output from the sigma-delta modulator 110 to generate a first sum signal, which is a signal of (N1+1) bits. Herein, all the N bits become the N1 bits, so N and N1 are the same.

The driver 130 receives the first sum signal and generates a driving signal (S_D). The driver 130 may include a decoder (not shown) and a converter (not shown). The decoder decodes the binary digital signal of N1 bits to generate thermometer code. The converter receives the thermometer code and converts the thermometer code into an analog signal. However, the driver 130 may receive the first sum signal and generate the driving signal (S_D) without a separate decoder. For reference, the thermometer code is code that is sequentially filled from “0” to “1”, like a thermometer.

Figure 2:
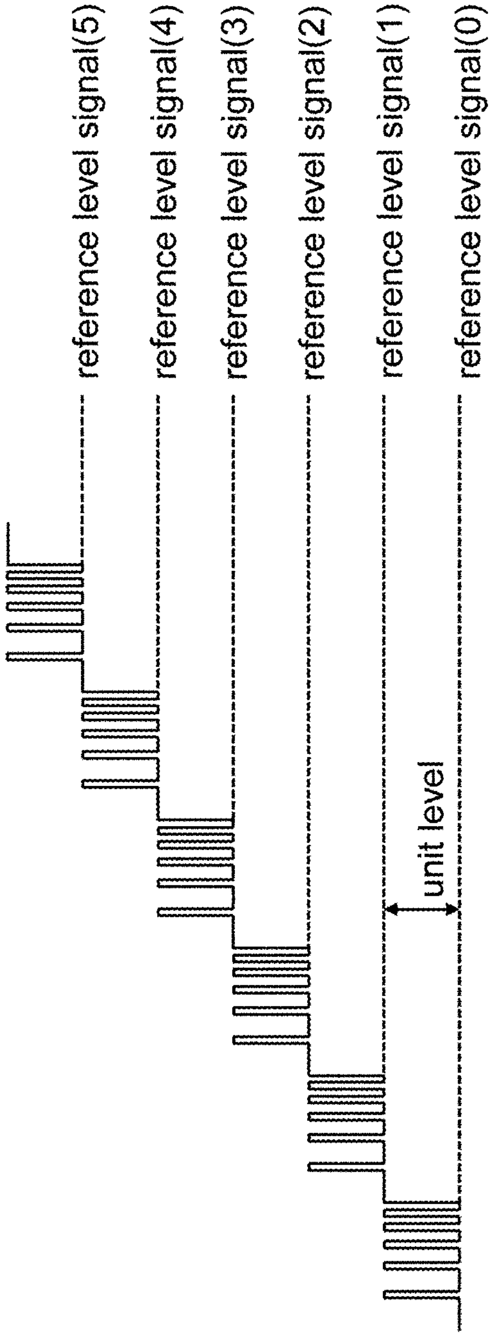
FIG. 2 shows an example diagram of the waveform of a driving signal.

FIG. 2 shows an example diagram of the waveform of a driving signal (S_D).

The driving signal (S_D) corresponds to a signal resulting from summing a reference level signal determined by the control signal of N bits (CON(N)) and an activation frequency signal of a pulse determined by the control signal of M bits (CON(M)).

That is, the driving signal (S_D) is a pulse with an amplitude of a unit level of the control signal of N bits (CON(N)) from the reference level signal determined by the value of the control signal of N bits (CON(N)), and the frequency of activation of the pulse is determined by the value of the control signal of M bits (CON(M)). Herein, the unit level is the smallest difference value between the reference level signals.

Figure 3:
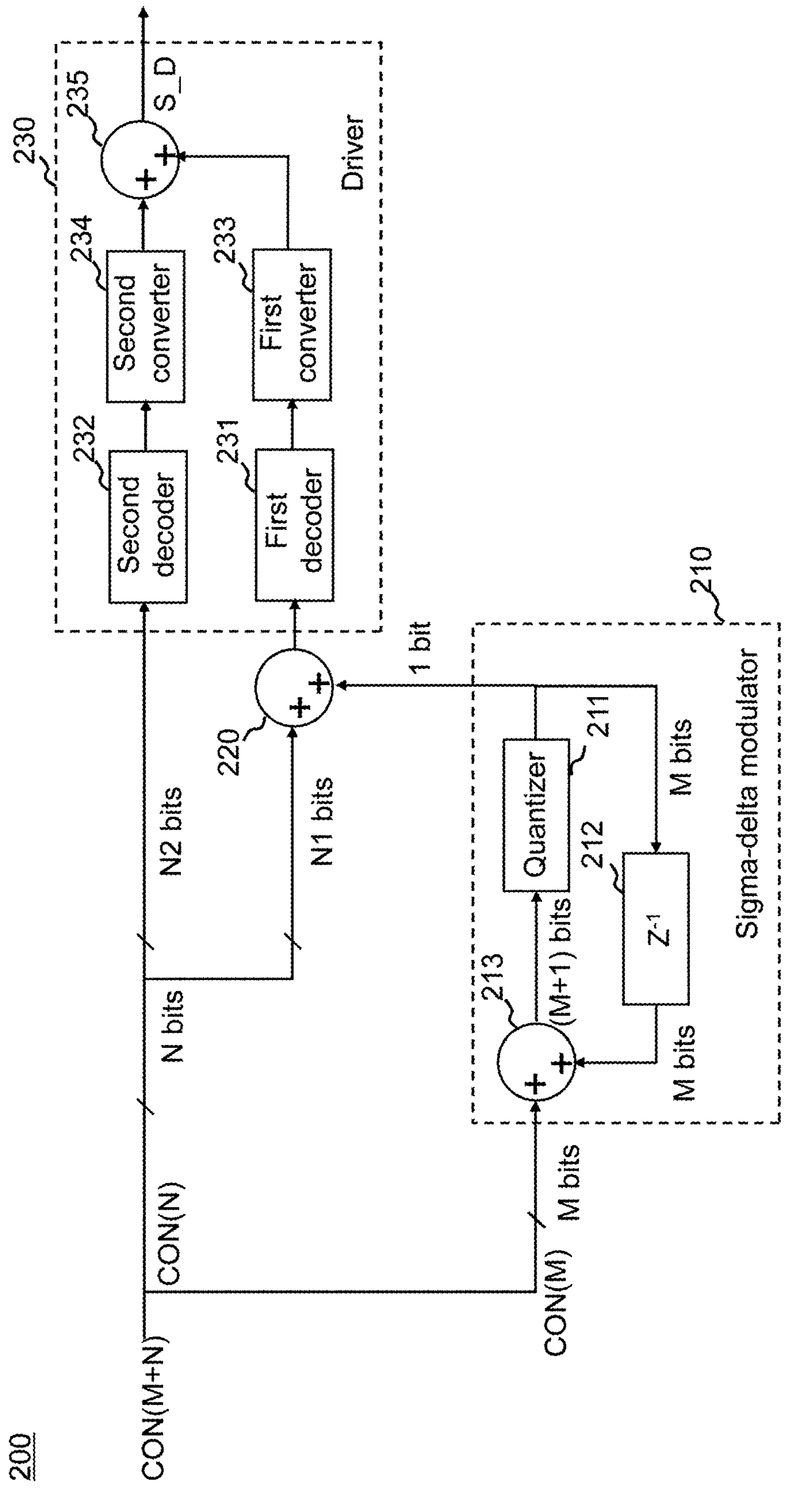
FIG. 3 shows a configuration diagram of a light-emitting diode driving device according to a second embodiment.

FIG. 3 shows a configuration diagram of a light-emitting diode driving device 200 according to a second embodiment.

As can be seen from FIG. 3, the light-emitting diode driving device 200 according to the second embodiment may include a sigma-delta modulator 210, a first summer 220, and a driver 230.

The configuration of the light-emitting diode driving device 200 according to the second embodiment which has the same name as the configuration of the light-emitting diode driving device 100 according to the first embodiment has the same features unless otherwise described.

However, in the light-emitting diode driving device 200 according to the second embodiment, N is divided into N1 and N2. That is, N has a value equal to the sum of N1 and N2, and N2 bits correspond to higher-order bits than N1 bits. Herein, N1 and N2 are natural numbers equal to or greater than 1.

The sigma-delta modulator 210 receives the control signal of M bits (CON(M)) and generates a quantized modulation signal of 1 bit, under a sigma-delta modulation scheme according to a reference clock (not shown). Specifically, the sigma-delta modulator 210 may include a quantizer 211, a feedback signal generator 212, and a second summer 213.

The first summer 220 sums a control signal of N1 bits of the control signal of N bits (CON(N)) and the modulation signal to generate a first sum signal, which is a signal of (N1+1) bits.

The driver 230 receives the first sum signal and generates a driving signal (S_D).

Hereinafter, the driver 230 of the light-emitting diode driving device 200 according to the second embodiment will be described in detail.

The driver 230 converts the first sum signal into an analog signal to generate a first analog signal, and converts a control signal of N2 bits of the control signal of N bits (CON(N)) into an analog signal to generate a second analog signal, and sums the first analog signal and the second analog signal to generate the driving signal (S_D). N2 is a natural number equal to or greater than 1, and N has a value equal to the sum of N1 and N2.

Specifically, the driver 230 may include a first decoder 231, a second decoder 232, a first converter 233, a second converter 234, and a third summer 235.

The first decoder 231 receives and decodes the first sum signal to generate a first thermometer code. In addition, the second decoder 232 receives and decodes the control signal of N2 bits of the control signal of N bits (CON(N)) to generate a second thermometer code. That is, the first decoder 231 and the second decoder 232 may each be implemented using a thermometer decoder, and may generate gray code called thermometer code.

The first converter 233 receives the first thermometer code and converts the same into an analog signal to generate the first analog signal. In addition, the second converter 234 receives the second thermometer code and converts the same into an analog signal to generate the second analog signal. The first converter 233 and the second converter 234 output analog current signals.

The third summer 235 sums the first analog signal and the second analog signal to generate the driving signal (S_D). That is, the first converter 233 and the second converter 234 output the analog current signals, and the third summer 235 sums the currents that are outputs of the first converter 233 and the second converter 234.

The waveform of the driving signal (S_D) of the light-emitting diode driving device 200 according to the second embodiment may also be represented in the same form as shown in FIG. 2.

The light-emitting diode driving devices 100 and 200 according to the first embodiment and the second embodiment have multi-bit sigma-delta structures, which are well suited for controlling lighting, such as light-emitting diodes, because the structures can theoretically achieve the best resolution relative to the operating speed and minimize current fluctuations in the time domain.

However, the light-emitting diode driving device 200 according to the second embodiment further improves the multi-bit sigma-delta structure of the light-emitting diode driving device 100 according to the first embodiment and has the following features.

In the multi-bit sigma-delta structure of the light-emitting diode driving device 100 according to the first embodiment, +1 and +0 continue alternating in the time domain, so minimal current error (toggling, glitch) in this part ensures the best image quality. For example, in the light-emitting diode driving device 100 according to the first embodiment, this issue can be addressed by processing all bits output from the first summer 110 into thermometer code with a decoder. However, even assuming a full bit of 10 bits, 1023 (=$2^{10}$−1) physical lines and a huge number of decoding operations are required.

However, in the light-emitting diode driving device 200 according to the second embodiment, the control signal of N bits (CON(N)) is processed divided into N1 bits and N2 bits, and the N1 bits and the N2 bits are processed with respective separate decoders 231 and 232, thereby finding a compromise between decoder size and performance.

In the structure in which the control signal of N bits (CON(N)) is divided into the N1 bits and the N2 bits, there may be a point where all the N2 bits are toggled in a sigma-delta operation. For example, assuming 0111(N2)+1111(N1)+1 or +0 (sigma-delta modulator), a very undesirable point of 1000,0000⇔0111+1111 may occur.

FIG. 4 shows a correspondence table of binary code and thermometer code according to an embodiment.

Binary code has weights that are powers of 2, and a small and simple digital circuit can be realized. However, the changes, namely, transitions, are very large, between bits, so when the changes are transferred to an analog circuit as they are, the performance of a final output is adversely affected, resulting in deterioration in image quality. However, in a digital circuit, many transitions do not cause any problems other than a small amount of current consumption.

As can be seen from FIG. 4, there is a point, such as between "0111" and "1000", where four bits of binary code are simultaneously toggled, and the current weights change by 31 (=$2^4+2^3+2^2+2^1+1$) weights.

However, in thermometer code, 1 bit has the meaning of 1 level only. Therefore, thermometer code has minimal weight change as much as variation in data, which is positive for the final output. However, in thermometer code, the size of the decoder and the number of physical lines of thermometer bits grow exponentially by a factor of $2^n$.

However, the toggle point shown in FIG. 4 is a singularity caused by carrying operation in a digital control scheme, and this is avoided by using the third summer 235 that sums currents in analog in the light-emitting diode driving device 200 according to the second embodiment. Thus, 1 bit is additionally assigned to the N1 bits and the third summer 235 sums currents, thereby improving the optimal size and performance of the decoders 231 and 232.

Hereinafter, a method for generating a driving signal (S_D) for a light-emitting diode according to the first embodiment will be described.

The method for generating the driving signal (S_D) for the light-emitting diode according to the first embodiment is executed by the light-emitting diode driving device 100 according to the first embodiment described above, so includes all features of the light-emitting diode driving device 100 according to the first embodiment even without a separate description.

In the method for generating the driving signal (S_D) for the light-emitting diode according to the first embodiment, the driving signal (S_D) for the light-emitting diode is generated using a control signal of (M+N) bits (CON(M+N)).

Specifically, the method for generating the driving signal (S_D) for the light-emitting diode according to the first embodiment includes: receiving a control signal of M bits (CON(M)) and generating a modulation signal of 1 bit in step S110; summing a control signal of N1 bits of a control signal of N bits (CON(N)) and the modulation signal to generate a first sum signal in step S120; and receiving the first sum signal and generating the driving signal (S_D) in step S130.

M is a natural number equal to or greater than 2, N1 is a natural number equal to or greater than 1, and N and N1 have the same value.

Specifically, step S110 includes: receiving a second sum signal and generating the modulation signal of 1 bit in step S111; receiving a lower-order M-bit signal other than the modulation signal of 1 bit of the second sum signal and generating a feedback signal in step S112; and summing the control signal of M bits (CON(M)) and the feedback signal to generate the second sum signal in step S113.

The driving signal (S_D) corresponds to a signal resulting from summing a reference level signal determined by the control signal of N bits (CON(N)) and an activation frequency signal of a pulse determined by the control signal of M bits (CON(M)).

Hereinafter, a method for generating a driving signal (S_D) for a light-emitting diode according to the second embodiment will be described.

The method for generating the driving signal (S_D) for the light-emitting diode according to the second embodiment is executed by the light-emitting diode driving device 200 according to the second embodiment described above, so includes all features of the light-emitting diode driving device 200 according to the second embodiment even without a separate description.

In the method for generating the driving signal (S_D) for the light-emitting diode according to the second embodiment, the driving signal (S_D) for the light-emitting diode is generated using a control signal of (M+N) bits (CON(M+N)).

Specifically, the method for generating the driving signal (S_D) for the light-emitting diode according to the second embodiment includes: receiving a control signal of M bits (CON(M)) and generating a modulation signal of 1 bit in step S210; summing a control signal of N1 bits of a control signal of N bits (CON(N)) and the modulation signal to generate a first sum signal in step S220; and receiving the first sum signal and generating the driving signal (S_D) in step S230.

M is a natural number equal to or greater than 2, N1 is a natural number equal to or greater than 1, and N is a natural number equal to or greater than N1.

Specifically, step S210 includes: receiving a second sum signal and generating the modulation signal of 1 bit in step S211; receiving a lower-order M-bit signal other than the modulation signal of 1 bit of the second sum signal and generating a feedback signal in step S212; and summing the control signal of M bits (CON(M)) and the feedback signal to generate the second sum signal in step S213.

Specifically, the driving signal (S_D) corresponds to a signal resulting from summing a reference level signal determined by the control signal of N bits (CON(N)) and an activation frequency signal of a pulse determined by the control signal of M bits (CON(M)).

In step S230, the first sum signal is converted into an analog signal to generate a first analog signal, and a control signal of N2 bits of the control signal of N bits (CON(N)) is converted into an analog signal to generate a second analog signal, and the first analog signal and the second analog signal are summed to generate the driving signal (S_D). N2 is a natural number equal to or greater than 1, and N has a value equal to the sum of N1 and N2.

Specifically, step S230 includes: receiving and decoding the first sum signal to generate first thermometer code in step S231; receiving and decoding the control signal of N2 bits of the control signal of N bits (CON(N)) to generate second thermometer code in step S232; receiving and converting the first thermometer code into the analog signal to generate the first analog signal in step S233; receiving and converting the second thermometer code into the analog signal to generate the second analog signal in step S234; and summing the first analog signal and the second analog signal to generate the driving signal (S_D) in step S235.

As described above, according to the light-emitting diode driving devices 100 and 200 and the method for generating a driving signal therefor according to the embodiments disclosed in the present specification, the multi-bit sigma-delta structure is used to achieve the best resolution relative to the operating speed and thus reduce flicker and minimize current fluctuations in the time domain, enabling a light-emitting diode to be driven with low electromagnetic interference (EMI).

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A light-emitting diode driving device using a control signal of (M+N) bits, the light-emitting diode driving device comprising:

a sigma-delta modulator configured to receive M bits of the control signal and generate a modulation signal of 1 bit;

a first summer configured to sum N1 bits selected from N bits of the control signal with the modulation signal to generate a first sum signal; and a driver configured to receive the first sum signal and generate a driving signal, wherein M is a natural number equal to or greater than 2, N1 is a natural number equal to or greater than 1, and N is a natural number equal to or greater than N1.

2. The light-emitting diode driving device of claim 1, wherein the driver comprises:

a first decoder configured to decode the first sum signal to generate a first thermometer code;

a second decoder configured to decode N2 bits selected from the N bits of the control signal to generate a second thermometer code;

a first converter configured to convert the first thermometer code into an analog signal to generate a first analog signal; and a second converter configured to convert the second thermometer code into an analog signal to generate a second analog signal, wherein N2 is a natural number equal to or greater than 1, and N has a value equal to a sum of N1 and N2.

3. The light-emitting diode driving device of claim 2, wherein the driver further comprises a third summer configured to sum the first analog signal and the second analog signal to generate the driving signal.

4. The light-emitting diode driving device of claim 1, wherein the driving signal corresponds to a signal resulting from summing a reference level signal determined by the N bits of the control signal and a pulse activation frequency signal determined by the M bits of the control signal.

5. The light-emitting diode driving device of claim 1, wherein the driver is configured to generate the driving signal by summing a first analog signal resulting from converting the first sum signal into an analog signal and a second analog signal resulting from converting N2 bits selected from the N bits of the control signal into an analog signal, N2 is a natural number equal to or greater than 1, and N has a value equal to a sum of N1 and N2.

6. A method for generating a driving signal for a light-emitting diode by using a control signal of (M+N) bits, the method comprising:

(a) receiving M bits of the control signal and generating a modulation signal of 1 bit;

(b) summing N1 bits selected from N bits of the control signal with the modulation signal to generate a first sum signal; and (c) receiving the first sum signal and generating the driving signal, wherein M is a natural number equal to or greater than 2, N1 is a natural number equal to or greater than 1, and N is a natural number equal to or greater than N1.

7. The method of claim 6, wherein the step (c) comprises:

(c-1) decoding the first sum signal to generate a first thermometer code;

(c-2) decoding N2 bits selected from the N bits of the control signal to generate a second thermometer code;

(c-3) converting the first thermometer code into an analog signal to generate a first analog signal; and (c-4) converting the second thermometer code into an analog signal to generate a second analog signal, wherein N2 is a natural number equal to or greater than 1, and N has a value equal to a sum of N1 and N2.

8. The method of claim 7, wherein the step (c) further comprises (c-5) summing the first analog signal and the second analog signal to generate the driving signal.

9. The method of claim 6, wherein the driving signal corresponds to a signal resulting from summing a reference level signal determined by the N bits of the control signal and a pulse activation frequency signal determined by the M bits of the control signal.

10. The method of claim 6, wherein in the step (c), the driver is configured to generate the driving signal by summing a first analog signal resulting from converting the first sum signal into an analog signal and a second analog signal resulting from converting N2 bits selected from the N bits of the control signal into an analog signal, N2 is a natural number equal to or greater than 1, and N has a value equal to a sum of N1 and N2.

* * * * *